(12) United States Patent
Bhaskaran et al.

(10) Patent No.: US 9,542,547 B2
(45) Date of Patent: Jan. 10, 2017

(54) IDENTIFICATION TO ACCESS PORTABLE COMPUTING DEVICE

(75) Inventors: Shinoj Bhaskaran, Karnataka (IN); Ruby Tomar, Karnataka (IN); Puneet Kumar Arora, Delhi (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 563 days.

(21) Appl. No.: 13/523,707

(22) Filed: Jun. 14, 2012

(65) Prior Publication Data

US 2013/0340073 A1  Dec. 19, 2013

(51) Int. Cl.
*G06F 21/34* (2013.01)

(52) U.S. Cl.
CPC ................................. *G06F 21/34* (2013.01)

(58) Field of Classification Search
None
See application file for complete search history.

(56) References Cited

U.S. PATENT DOCUMENTS

| | | | |
|---|---|---|---|
| 6,868,282 B2* | 3/2005 | Carlsson | 455/558 |
| 7,561,691 B2 | 7/2009 | Blight et al. | |
| 8,090,364 B2* | 1/2012 | Delalat | 455/420 |
| 8,112,066 B2 | 2/2012 | Ben Ayed | |
| 8,244,283 B1* | 8/2012 | Booth | 455/461 |
| 8,437,802 B2* | 5/2013 | Morikuni et al. | 455/558 |
| 2005/0026595 A1* | 2/2005 | Huckins | 455/411 |
| 2007/0123305 A1 | 5/2007 | Chen et al. | |
| 2009/0094681 A1 | 4/2009 | Sadler et al. | |
| 2009/0312055 A1* | 12/2009 | Liu | 455/558 |
| 2010/0207721 A1* | 8/2010 | Nakajima et al. | 340/5.3 |
| 2010/0304670 A1 | 12/2010 | Shuo | |
| 2011/0136470 A1 | 6/2011 | Kurz | |
| 2012/0171995 A1* | 7/2012 | Krafzik et al. | 455/411 |
| 2013/0023207 A1* | 1/2013 | Chen et al. | 455/41.1 |

FOREIGN PATENT DOCUMENTS

| | | | | |
|---|---|---|---|---|
| GB | 2365699 A | * | 2/2002 | H04Q 7/22 |
| WO | 2007107749 A1 | | 9/2007 | |

* cited by examiner

*Primary Examiner* — Kaveh Abrishamkar
(74) *Attorney, Agent, or Firm* — HP Inc. Patent Department (57) ABSTRACT

A portable computing device receives an identity card and restricts access to the portable computing device if the identity card is unassociated with the portable computing device. If access to the portable computing device is restricted, the portable computing device receives identification from a second portable computing device and grants access to the portable computing device if the identification is successfully authenticated.

23 Claims, 5 Drawing Sheets

IDENTIFICATION TO ACCESS PORTABLE COMPUTING DEVICE

BACKGROUND

When a user would like to use a portable computing device to access a communication network, such as a service provider, the user can insert an identity card, such as a subscriber identity module (SIM) card, into the portable computing device. In some instances, if an unrecognized SIM card is inserted, the portable computing device may become locked and access to features of the portable computing device can be locked or restricted from access. The user can attempt to enter a personal identification number to unlock the portable computing device. In another example, the user can contact the service provider for the portable computing device to be unlocked.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

A user can associate a portable computing device, such as a smart phone, with a second portable computing device. In one example, the user can use an identification number of the second portable computing device when associating the portable computing device with the second portable computing device. The identification from the second portable computing device can be used as an unlocking mechanism if the portable computing device becomes locked for security reasons. If a card module of the portable computing device, such as a slot or compartment, receives an unassociated identity card, the portable computing device becomes locked and access to features and/or content of portable computing device is restricted. In one example, the identity card can be a subscriber identity module (SIM) card used to identify the portable computing device to a network, such as a service provider.

As access to the portable computing device is restricted, a communication component, such as a near field communication component, detects for the second portable computing device. If the second portable computing device is within proximity of the portable computing device, an identification of the second portable computing device can be received. The identification can be received over the near field communication or as a message. The computing device can authenticate the identification of the second portable computing device which was previously associated to the portable computing device by the user. If the identification is successfully authenticated, access to the portable computing device can be granted.

Figure 1:
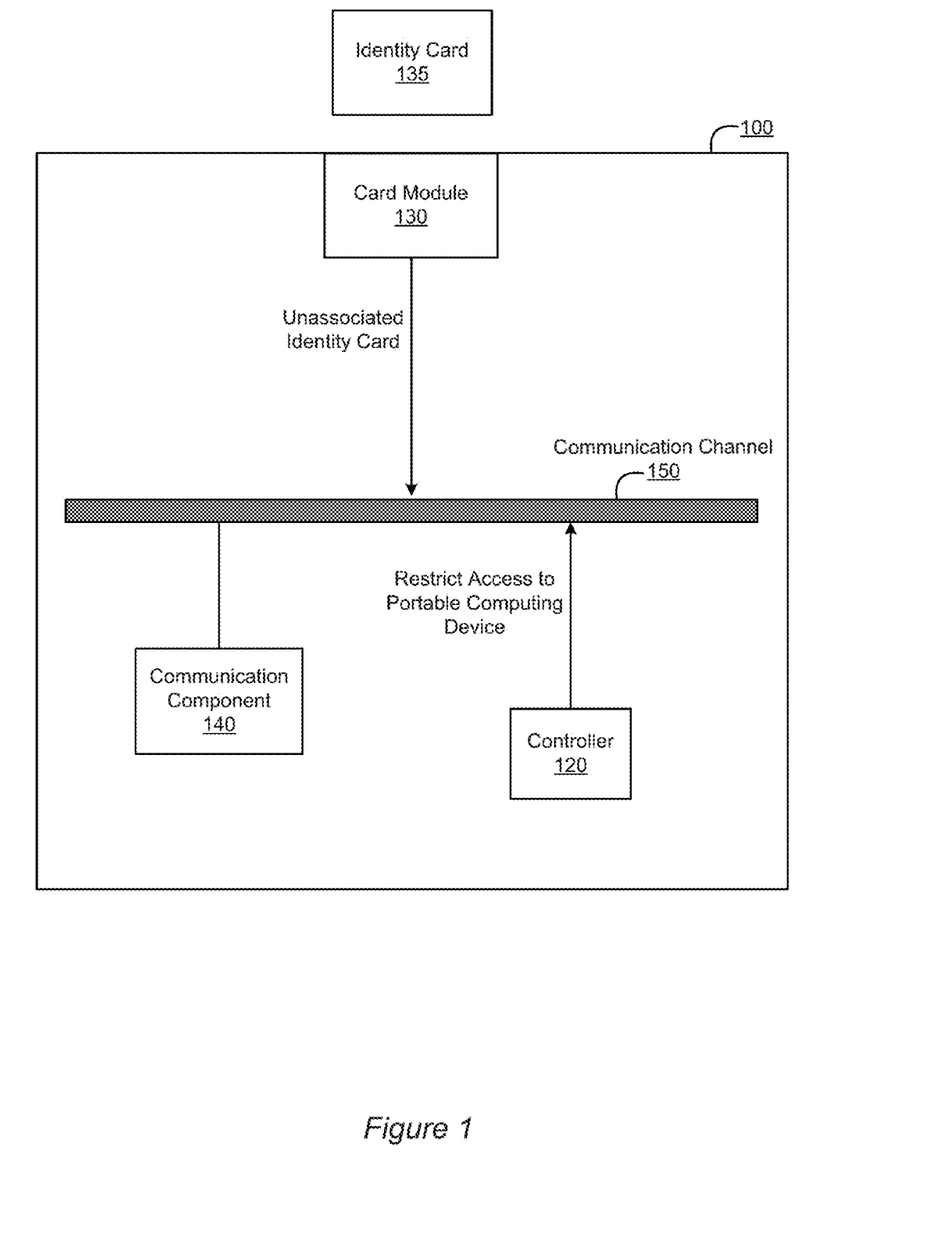
FIG. 1 illustrates a portable computing device with a card module to receive an identity card according to an example.

FIG. 1 illustrates a portable computing device 100 with a card module 130 to receive an identity card 135 according to an example. In one embodiment, the portable computing device 100 can be a cellular device, a smart phone, a PDA (Personal Digital Assistant), and/or an E (Electronic)—Reader. In another embodiment, the portable computing device 100 can be a notebook, a netbook, a tablet, an all-in-one system, and/or any additional portable computing device 100 to receive an identity card 135.

The portable computing device 100 includes a controller 120, a communication component 140, a card module 130, and a communication channel 150 for the portable computing device 100 and/or one or more components of the portable computing device 100 to communicate with one another. In one embodiment, the portable computing device 100 also includes an authentication application stored on a non-volatile computer readable medium included in or accessible to the portable computing device 100. For the purposes of this application, the authentication application is an application which can be utilized independently and/or in conjunction with the controller 120 to manage access to the portable computing device 100.

When managing access, the controller 120 and/or the authentication application initially determine if an identity card 135 coupled to a card module 130 is associated with the portable computing device 100. For the purposes of this application, the identity card 135 is a hardware component, such as a subscriber identity module (SIM) card, which includes information used by the controller 120 and/or the authentication application to determine whether to grant access to the portable computing device 100. In one embodiment, the identity card 135 also includes information used to access a network and/or service provider. The card module 130 can be a slot or compartment which receives and houses the identity card 135.

When determining if the identity card 135 is associated with the portable computing device 100, the controller 120 and/or the authentication application determine if the identity card 135 is registered with the portable computing device 100. In one embodiment, the identity card 135 is registered if a card number of the identity card 135 is included in a white list of the portable computing device 100. The card number is a sequence of numbers and/or characters corresponding to the identity card 135. The white list includes card numbers of identity cards 135 recognized by the controller 120 and/or the authentication application.

If the identity card 135 is determined to be associated with the portable computing device 100, the controller 120 and/or the authentication application can proceed to associate the portable computing device 100 with a second portable computing device. Similar to the portable computing device 100, the second portable computing device can be a smart phone, a PDA, an E-Reader, a notebook, a tablet, a netbook, an all-in-one system, and/or any additional portable computing device associated with the user. In one embodiment, the second portable computing device can be another computing device of the user's. In another embodiment, the second portable computing device can be a computing device of a family member or a friend of the user.

When associating the portable computing device 100 to the second portable computing device, an identification of the second portable computing device can be entered and stored on the portable computing device 100. The identification number includes a sequence of numbers and/or characters corresponding to the identity of the second portable computing device. In one embodiment, the identification number is a telephonic number, an international mobile equipment identity number, a serial number, and/or a manufacturing number of the second portable computing device.

The user can enter the identification number into the portable computing device 100 with an input component, such as a keyboard, a touch screen and/or a microphone. In another embodiment, a communication component 140 can receive the identification number from the second portable computing device over a data connection or as a message from the second portable computing device. The communication component 140 is a hardware component which can receive and/or transmit information, such as the identification between the portable computing device 100 and the second portable computing device.

In response to receiving the identification number, the controller 120 and/or the authentication application store the received identification as an unlock code of the portable computing device 100. For example, the identification number can be stored in a secure non-volatile storage component accessible to the controller 120 and/or authentication application. By using the identification of the associated second portable computing device as an unlock code, the user can easily remember the unlock code for the purposes of unlocking the portable computing device 100 if the portable computing device 100 is locked for security reasons. The portable computing device 100 can be locked if the controller 120 and/or the authentication application determine that a security risk is present.

For example, if an unassociated identity card is coupled to the portable computing device 100, the controller 120 and/or the authentication application determine that a security risk is present and proceed to lock the portable computing device 100. For the purposes of this application, an unassociated identity card is an identity card 135 which is not recognized and/or registered with the portable computing device 100. In one example, an unassociated identity card can be coupled to the portable computing device 100 if the portable computing device 100 has been stolen and a person attempts to insert another identity card 135 into the card module 130 to gain access to features and/or content of the portable computing device 100.

When locking the portable computing device 100, the controller 120 and/or the authentication application restrict access to features and/or content of the portable computing device 100. By restricting access to features and/or content of the portable computing device 100, the portable computing device 100 can become un-useable or un-responsive to an unauthorized user attempting to access the portable computing device. As a result, the features and/or content of the portable computing device 100 are secured from unauthorized access if an unassociated identity card 135 is coupled to the portable computing device 100.

For the purposes of this application, a feature of the portable computing device 100 can include a mode of operation, such as a wireless communication mode, an unlocked mode, a power-on mode and/or any additional mode of operation of the portable computing device 100. In one embodiment, restricting access to a feature includes restricting access or disabling a component of the portable computing device 100, such as a communication component, a display component, an audio component, and/or any additional component. Content of the portable computing device 100 can include files, contacts, media, and/or any additional data included on the portable computing device 100 or accessible by the portable computing device 100.

As access to features and/or content is restricted, the communication component 140 detects for the second portable computing device within proximity of the portable computing device 100. In one embodiment, the communication component 140 is used exclusively by the controller 120 and/or the authentication application to detect for the second portable computing device. Any other attempt to use the communication component 140 to receive and/or transmit information can be ignored as to protect the features and/or content of the portable computing device 100.

The second portable computing device is within proximity of the portable computing device 100 if the communication component 140 detects a communication from the second portable computing device. The communication component can detect the communication if the second portable computing device is within a predefined distance or radius of the communication component 140. If the second portable computing device is within proximity, the controller 120 and/or the authentication application can prompt the second portable computing device for identification. In another embodiment, the communication component 140 can receive a message, such as a text or media message, with the identification from the second portable computing device.

In response to receiving the identification, the controller 120 and/or the authentication application compare the received identification to the identification number stored on the portable computing device 100. If the received identification does not match the previously stored identification number, access to the portable computing device 100 continues to be restricted. If the received identification from the second portable computing device matches the previously stored identification number, the controller 120 and/or the authentication application proceed to unlock the portable computing device 100 and grant access to the features and/or content of the portable computing device 100.

Figure 2:
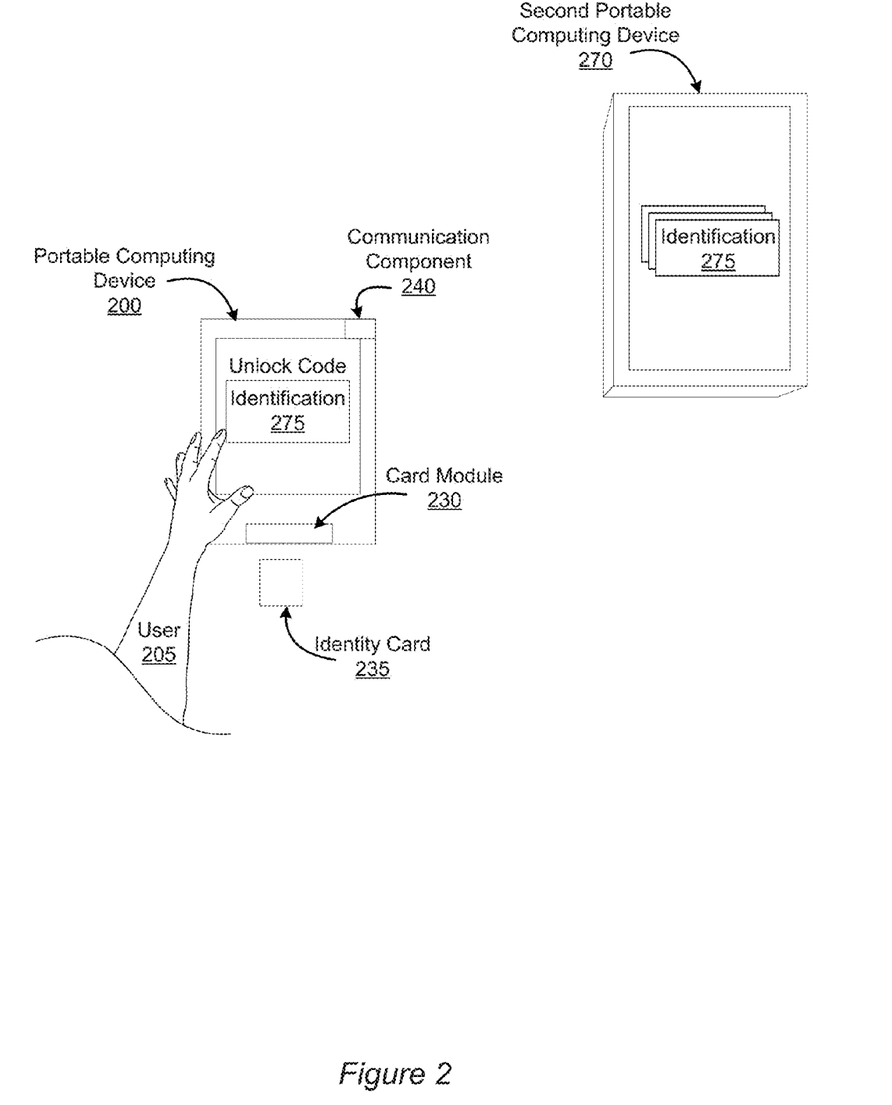
FIG. 2 illustrates a user associating an identification of a second portable computing device with a portable computing device according to an example.

FIG. 2 illustrates a user 205 associating an identification 275 of a second portable computing device 200 with a portable computing device 200 according to an example. The user 205 can be the owner of the portable computing device 200 or a person authorized to use the portable computing device 200. Further, the second portable computing device 270 can be another computing device of the user 205 or a computing device of a family member or a friend of the user 205. The second portable computing device 270 can be a smart phone, PDA, a tablet, a laptop, a notebook, a tablet, a netbook, an all-in-one system, and/or any additional device which includes identification 275.

For the purposes of this application, the identification 275 includes a sequence of numbers and/or characters corresponding to an identity of the second portable computing device 270. For example, the identification 275 can be a telephonic number, an international mobile equipment identity number, a serial number, and/or a manufacturing number of the second portable computing device 270. The user 205 can associate the portable computing device 200 with the second portable computing device 270 using the identification 275.

In one embodiment, the user 205 can access an input component of the portable computing device 200 (not shown) to enter the identification 275. The input component can be an alphanumeric keyboard, a touch screen, and/or a microphone of the portable computing device 200. In another embodiment, the portable computing device 200 can receive the identification 275 from the second portable computing device 200 through a communication component

240. The identification 275 can be received as a file, a tag, and/or as a message. The message can be a text message or a media message.

As noted above, the communication component 240 is a hardware component for the portable computing device 200 to communicate with the second portable computing device 270. In one embodiment, the communication component 240 can be a near field communication component, a Bluetooth component, and/or an infra-red component which communicates with the second portable computing device 270 within proximity of the portable computing device 200. In another embodiment, the communication component 240 can be a wireless radio component which receives the identification 275 through a message transmitted from the second portable computing device 270.

In response to receiving the identification 275, the controller and/or the authentication application store the identification as an unlock code for the portable computing device 200. For the purposes of this application, the unlock code includes a sequence of numbers and/or characters which is used to unlock the portable computing device 200 if access to the portable computing device 200 is restricted. In one embodiment, if the identification 275 is received by the communication component 240, the user 205 can be prompted whether to accept and store the identification 275 as an unlock code.

As noted above, the controller and/or the authentication application restrict access to the portable computing device 200 if the card module 230 receives an identity card 235 which is unassociated with the portable computing device 200. The card module 230 is a hardware and/or mechanical component which couples the identity card 235 to the portable computing device 200. The card module 230 can include a slot and/or a compartment to receive the identity card 235 and interface the identity card 235 with the controller and/or the authentication application. The identity card 235 is a hardware component used as an identification of the portable computing device 200 and/or as identification for the user 205. The identity card 235 can also include information for the portable computing device 200 to access a network and/or a service provider.

As noted above, the identity card 235 is unassociated with the portable computing device 200 if a card number, such as a unique serial number, international mobile subscriber identity, and/or a personal identification number of the identity card 235 is not registered with the portable computing device 200. If the card number from the identity card 235 does not match any previously stored card numbers included in a white list of the portable computing device 200, the controller and/or the authentication application determine that the identity card 235 is unassociated with the portable computing device 200 and access to the features and/or content of the portable computing device 200 is restricted.

Figure 3:
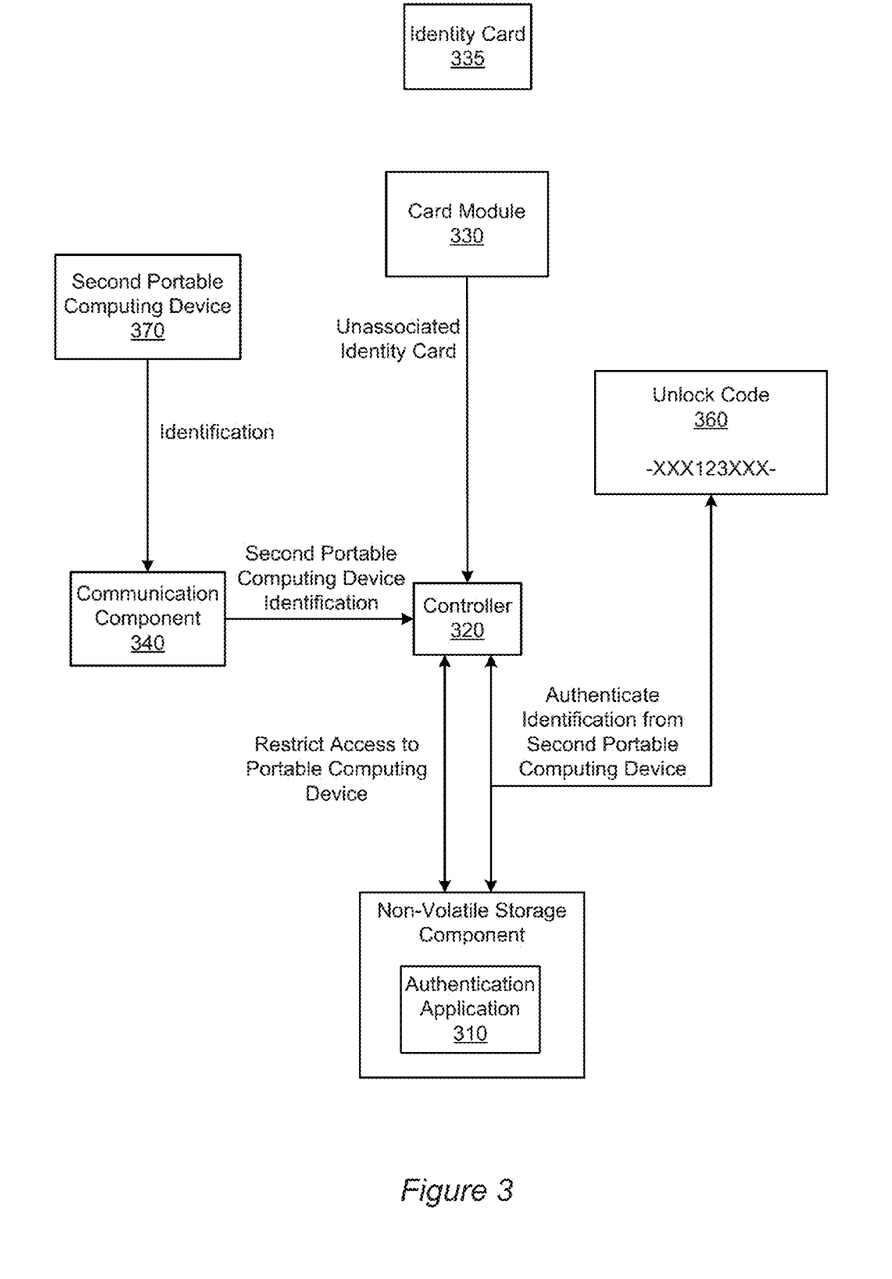
FIG. 3 illustrates a block diagram of an authentication application restricting access to a portable computing device according to an example.

FIG. 3 illustrates a block diagram of an authentication application 310 restricting access to a portable computing device according to an example. As noted above, the authentication application 310 can be utilized independently and/or in conjunction with the controller 320 to manage access to the portable computing device. In one embodiment, the authentication application 310 can be a firmware embedded onto one or more components of the portable computing device. In another embodiment, the authentication application 310 can be an application accessible from a non-volatile computer readable memory of the portable computing device. The computer readable memory is a tangible apparatus that contains, stores, communicates, or transports the application for use by or in connection with the portable computing device. The computer readable memory can be a hard drive, a compact disc, a flash disk, a network drive or any other tangible apparatus coupled to the portable computing device.

As shown in FIG. 3, the communication component 340 initially receives identification from the second portable computing device 370. The controller 320 and/or the authentication application 310 store the identification as an unlock code for the portable computing device. The controller 320 and/or the authentication application 310 can also poll the card module 330 to determine if a new identity card 335 has been coupled to the portable computing device. If a new identity card 335 has been inserted, the controller 320 and/or the authentication application 310 determine if the new identity card 335 is registered with the portable computing device. If the new identity card 335 is not registered with the portable computing device, the controller 320 and/or the authentication application 310 determine that the new identity card 335 is unassociated and proceed to restrict access to the portable computing device.

When restricting access to the portable computing device, the controller 320 and/or the authentication application 310 restrict access to features and/or content of the portable computing device. A feature of the portable computing device can include a mode of operation, such as a wireless communication mode, an unlocked mode, an input mode, a power-on mode and/or any additional mode of operation of the portable computing device. Content of the portable computing device include files, contacts, media, and/or any additional data included in or accessible by the portable computing device.

In one embodiment, restricting access to a feature includes restricting access or disabling a component of the portable computing device used by a mode of operation. For example, disabling the feature: wireless communication mode can include disabling the communication component 340 from access. In another example, disabling the feature: input mode can include disabling an input component. When restricting access to the content, the controller 320 and/or the authentication application 310 can hide the content. In another embodiment, the controller 320 and/or the authentication application 310 can disable a storage component including the content or restrict the communication component 340 from accessing the content from another device.

As access to the portable computing device remains restricted, the communication component 340 detects if the second portable computing device is within proximity of the portable computing device. As the communication component 340 detects for the second portable computing device, the communication component 340 remains inaccessible to an unauthorized user and is not used for any other purpose than detecting for the second portable computing device. The communication component 340 can establish a near field communication to detect for the second portable computing device. If the second portable computing device is detected within a detectable radius of the communication component 340, the controller 320 and/or the authentication application 310 can receive the identification. In another example, if the communication component 340 includes a wireless radio component, the communication component 340 can receive a message, such as a text or media message, including the identification from the second portable computing device.

The user, a friend, and/or a family member of the user can access the second portable computing device 370 to transmit the identification to the portable computing device. In response to receiving the identification, the controller 320 and/or the authentication application 310 determine if the identification matches an unlock code 360 of the portable computing device. As noted above, the unlock code is a previously associated identification received from the second portable computing device 370. If the identification does not match the previously stored identification, the controller 320 and/or the authentication application 310 continue to restrict access to the portable computing device.

In one embodiment, the controller 320 and/or the authentication application 310 additionally transmit a message in the form of a text message and/or an email message to an account associated with the user of the portable computing device that an unassociated identity card 335 has been coupled to the portable computing device and access to the portable computing device has been restricted. In another embodiment, the message can also be sent to a service provider of the portable computing device.

If the identification matches the previously associated identification of the second portable computing device, the controller 320 and/or the authentication application 310 unlock the portable computing device and access to the features and/or content of the portable computing device is granted to a user of the portable computing device. When granting access to the portable computing device, the controller 320 and/or the authentication application 310 allow access to the features and/or content which were previously restricted. In one embodiment, allowing access to the feature and/or content includes enabling the components used by the features and/or the content.

In other embodiments, instead of receiving the identification from the second portable computing device 370, the second portable computing device 370 can transmit the identification to a network and/or service provider of the portable computing device. The network and/or service provider can receive the identification and determine if the identification matches an unlock code of the portable computing device. If the identification matches the unlock code, the service provider can transmit the unlock code to the portable computing device. The controller 320 and/or the authentication application 310 can then unlock the portable computing device and access to the features, and/or content of the portable computing device is granted.

Figure 4:
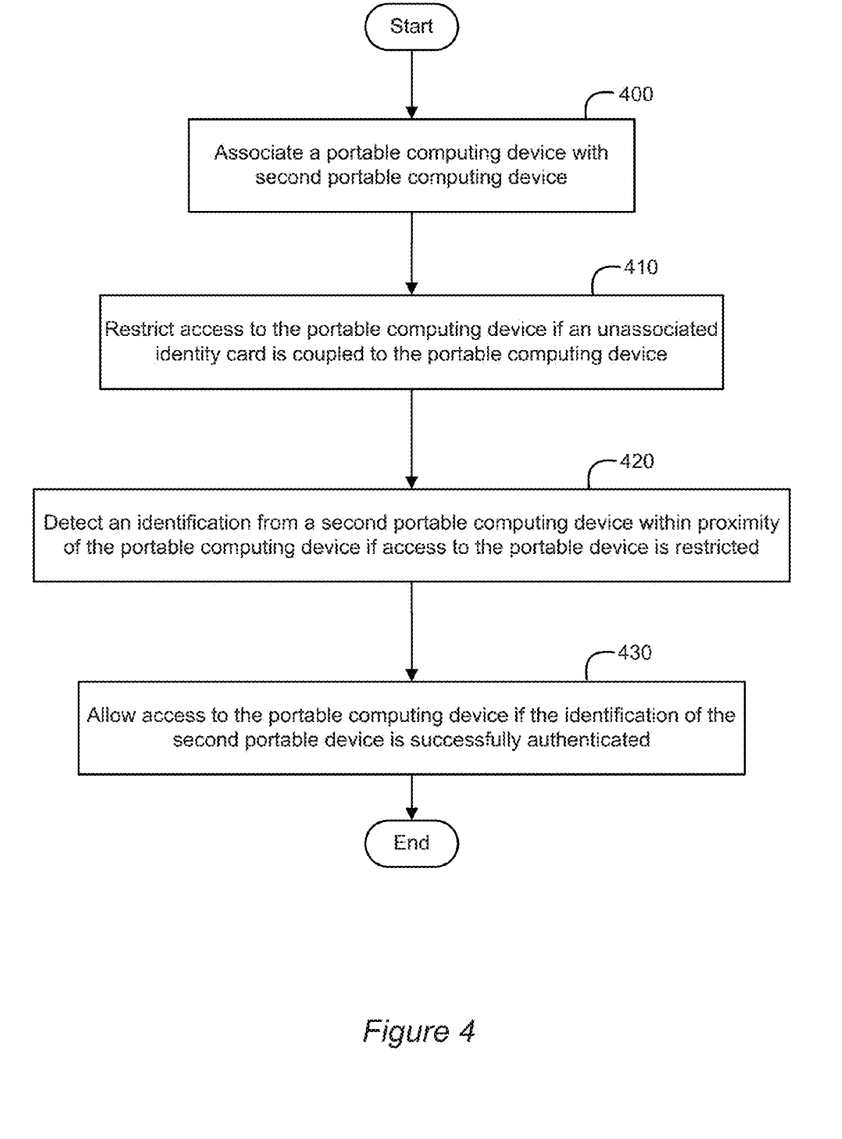
FIG. 4 is a flow chart illustrating a method for authenticating a portable computing device according to an example.

FIG. 4 is a flow chart illustrating a method for authenticating a portable computing device according to an example. The authentication application and/or the controller initially associate the portable computing device with a second portable computing device at 400. For example, the authentication application and/or the controller can detect a user entering an identification number, such as a telephone number, associated with the second portable computing device. Once the portable computing device has been associated with a second portable computing device, the card module detects for an unassociated identity card coupled to the portable computing device. If an unassociated identity card is inserted, the authentication application and/or the controller can restrict access to the portable computing device at 410.

As access to the portable computing device is restricted, the controller and/or the authentication application detect for the second portable computing device. If the second portable computing device is within proximity of the portable computing device, the portable computing device receives the identification from the second portable computing device at 420. The authentication application and/or the controller can then allow access to the portable computing device if the identification is successfully authenticated at 430. The method is then complete. In other embodiments, the method of FIG. 4 includes additional steps in addition to and/or in lieu of those depicted in FIG. 4.

Figure 5:
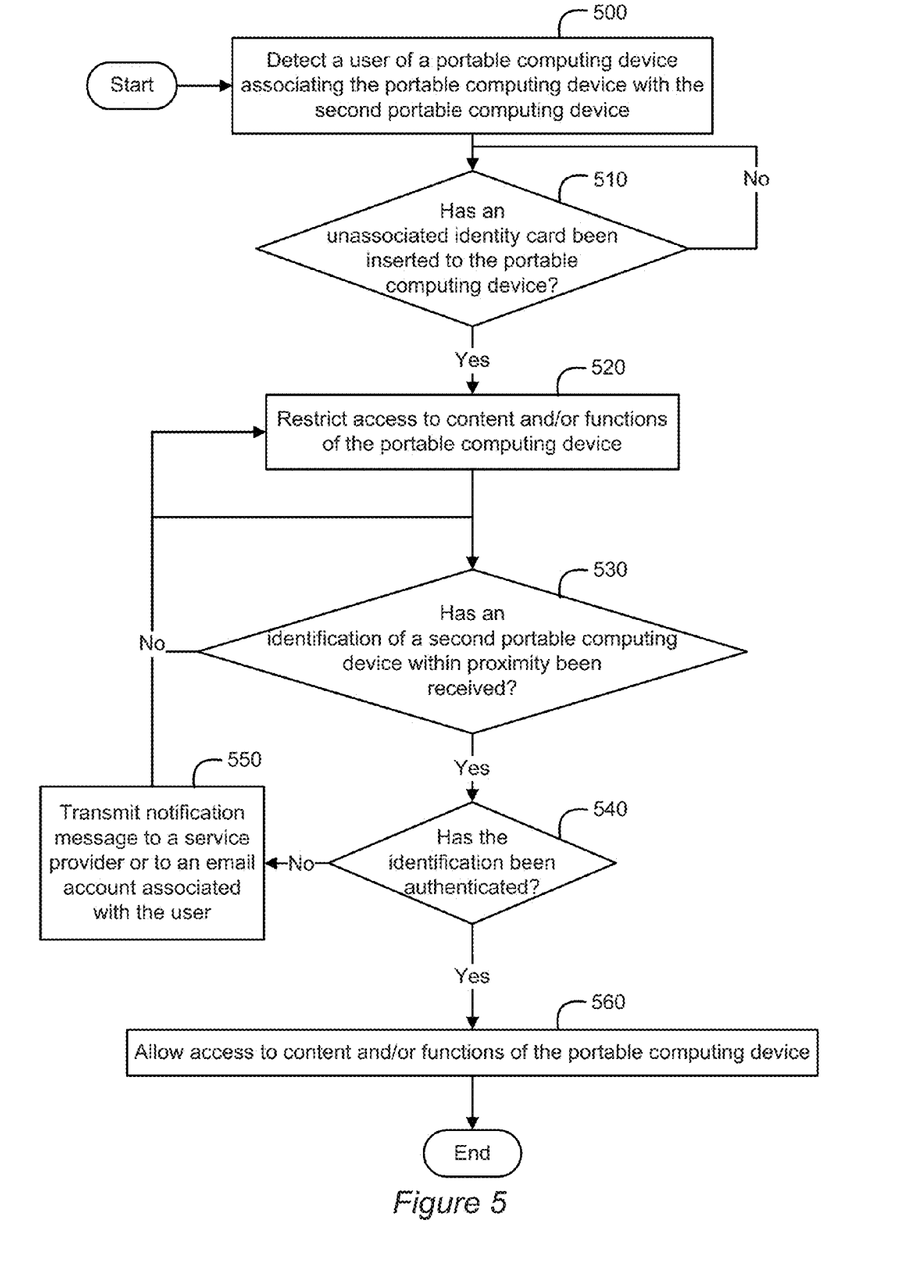
FIG. 5 is a flow chart illustrating a method for authenticating a portable computing device according to an example.

FIG. 5 is a flow chart illustrating a method for authenticating a portable computing device according to an example. The authentication application and/or the controller initially detect a user associate the portable computing device with the second portable device using an identification number of the second portable computing device at 500. The card module can detect if an unassociated identity card is inserted into the portable computing device at 510. If the authentication application and/or the controller do not detect an unassociated identity card, the authentication application and/or the controller continue to detect for an unassociated identity card at 510.

If an unassociated identity card is received, the authentication application and/or the controller proceed to restrict access to features and/or content of the portable computing device at 520. A communication component can then detect for a second portable computing device within proximity of the portable computing device. If the second portable computing device is within proximity, the communication component can receive identification of the second portable computing device at 530. If no identification is received, the authentication application and/or the controller continue to detect for the identification from the second portable computing device at 530.

If identification is received from the second portable computing device, the authentication application and/or the controller attempt to authenticate the identification at 540. If the identification fails authentication, the authentication application and/or the controller can use the communication component to transmit a notification message to a service provider or to an email account associated with the user at 550. Access to the portable computing device can continue to be restricted at 520. If the identification is successfully authenticated, the authentication application and/or the controller proceed to unlock the portable computing device and allow access to the features and/or content of the portable computing device at 560. The method is then complete. In other embodiments, the method of FIG. 5 includes additional steps in addition to and/or in lieu of those depicted in FIG. 5.

What is claimed is:

1. A first portable computing device comprising:
   a card module to physically receive an identity card for the first portable computing device;
   a controller to restrict access to the first portable computing device if the identity card physically received in the card module is unassociated with the first portable computing device; and
   a communication component to wirelessly communicate with a second portable computing device that is within a predefined proximity of the first portable computing device;
   wherein the controller is to:
      in response to determining that access to the first portable computing device is restricted as a result of the physically received identity card being unassociated with the first portable computing device, determine whether the communication component has wirelessly received an identification of the second portable computing device from the second portable computing device that is within the predefined proximity;
      authenticate the received identification by comparing the received identification with a stored identification of the second portable computing device stored in the first portable computing device; and grant access to the first portable computing device in response to the received identification being successfully authenticated based on the comparing.

2. The first portable computing device of claim 1 wherein the identity card is a subscriber identity module.

3. The first portable computing device of claim 1 wherein the communication component is a near field communication component.

4. The first portable computing device of claim 1 wherein the controller is to further associate the first portable computing device with the stored identification of the second portable computing device by storing, in response to user input, the stored identification of the second portable computing device in the first portable computing device.

5. The first portable computing device of claim 4 wherein the stored identification includes at least one of a telephonic number of the second portable computing device, a manufacturing number of the second portable computing device, a serial number of the second portable computing device, and an international mobile equipment identity of the second portable computing device.

6. The first portable computing device of claim 1 wherein the stored identification of the second portable computing device is registered on the first portable computing device as an unlock code to allow access to at least one of features and content of the first portable computing device if the card module receives an unassociated identity card.

7. The first portable computing device of claim 1 wherein the controller is to continue to restrict access to the first portable computing device if the received identification from the second portable computing device is not successfully authenticated.

8. The first portable computing device of claim 1 wherein the controller is to, in response to the received identification of the second portable computing device not being successfully authenticated, cause sending of a notification message of unsuccessful authentication to an entity external of the first portable computing device.

9. A method comprising:
associating a first portable computing device with a second portable computing device by storing an identification of the second portable computing device in the first portable computing device;
restricting access to the first portable computing device if an unassociated identity card is physically received in a card module of the first portable computing device;
wirelessly receiving, by the first portable computer device, an identification of the second portable computing device from the second portable computing device within a predefined proximity of the first portable computing device, in response to access to the first portable computing device being restricted as a result of the unassociated identity card being physically received in the card module of the first portable computing device;
authenticating the received identification by comparing, by the first portable computing device, the received identification to the stored identification; and
granting access to the first portable computing device in response to the received identification of the second portable computing device being successfully authenticated based on the comparing.

10. The method of claim 9 wherein wirelessly receiving the identification from the second portable computing device includes establishing a near field communication between the first portable computing device and the second portable computing device to receive the identification.

11. The method of claim 9 wherein the associating includes receiving user input of a telephonic number associated with the second portable computing device, and wherein the comparing compares the received identification to the telephonic number.

12. The method of claim 9 wherein restricting access to the first portable computing device includes restricting access to a feature of the first portable computing device.

13. The method of claim 9 wherein restricting access to the first portable computing device includes restricting access to content of the first portable computing device.

14. The method of claim 9 wherein restricting access to the first portable computing device includes restricting access to a component of the first portable computing device.

15. The method of claim 9, further comprising:
in response to the received identification of the second portable computing device not being successfully authenticated, sending a notification message of unsuccessful authentication to an entity external of the first portable computing device.

16. The method of claim 15 wherein the notification message is sent to a service provider of the first portable computing device or an email account associated with a user of the first portable computing device in response to the received identification of the second portable computing device failing authentication.

17. The method of claim 9, wherein storing the identification of the second portable computing device in the first portable computing device is in response to user input.

18. A non-transitory computer readable medium comprising instructions that if executed cause a controller of a first portable computing device to:
store an identification of a second portable computing device in the first portable computing device;
restrict access to the first portable computing device if an unassociated identity card is physically received in a card module of the first portable computing device;
in response to access to the first portable computing device being restricted as a result of the unassociated identity card being physically received in the card module of the first portable computing device, detect for the second portable computing device within a predefined proximity of the first portable computing device to wirelessly receive an identification of the second portable computing device from the second portable computing device;
authenticate the received identification by comparing the received identification to the stored identification; and
grant access to the first portable computing device in response to the received identification of the second portable computing device being successfully authenticated based on the comparing.

19. The non-transitory computer readable medium of claim 18, wherein the instructions if executed cause the controller to further:
in response to the received identification of the second portable computing device not being successfully authenticated, send a notification message of unsuccessful authentication to an entity external of the first portable computing device.

20. The non-transitory computer readable medium of claim 18, wherein storing the identification of the second portable computing device in the first portable computing device is in response to user input.

21. The non-transitory computer readable medium of claim 19 wherein the notification message is sent to a service provider of the first portable computing device.

22. The non-transitory computer readable medium of claim 21 wherein the instructions cause the controller to receive an unlock code from the service provider.

23. The non-transitory computer readable medium of claim 22 wherein the instructions cause the controller to grant access to the first portable computing device in response to receiving the unlock code from the service provider.

* * * * *